United States Patent [19]
Press et al.

[11] 4,046,406
[45] Sept. 6, 1977

[54] FIRE-SAFE JACKET FOR FLUID PIPING COMPONENTS

[75] Inventors: Irving D. Press, West Orange; Helm A. Rink, North Haledon; Harvey R. Nickerson, Roseland, all of N.J.

[73] Assignee: Resistoflex Corporation, Roseland, N.J.

[21] Appl. No.: 577,849

[22] Filed: May 15, 1975

[51] Int. Cl.² .............................................. F16L 59/16
[52] U.S. Cl. ........................................ 285/47; 285/55; 138/149; 137/375
[58] Field of Search .................. 285/47, 55, DIG. 16; 138/149, 148, 114, 113; 137/375

[56] References Cited

U.S. PATENT DOCUMENTS

| | | | |
|---|---|---|---|
| 313,958 | 3/1885 | Seymour | 285/47 X |
| 315,565 | 4/1885 | Speer | 285/55 |
| 438,507 | 10/1890 | Tracey | 285/47 |
| 474,006 | 5/1892 | Fryer | 285/55 X |
| 754,256 | 3/1904 | Sullivan | 285/47 |
| 1,463,461 | 7/1923 | Davis | 285/55 |
| 3,361,448 | 1/1968 | Warrington | 285/55 |
| 3,633,943 | 1/1972 | Ramm | 285/DIG. 16 |
| 3,677,303 | 7/1972 | Martin | 285/47 |
| 3,724,491 | 4/1973 | Knudsen | 138/149 X |
| 3,811,649 | 5/1974 | Press | 251/8 |

FOREIGN PATENT DOCUMENTS

| | | | |
|---|---|---|---|
| 535,224 | 11/1955 | Italy | 137/375 |
| 11,380 of | 1905 | United Kingdom | 138/148 |

Primary Examiner—Andrew V. Kundrat
Attorney, Agent, or Firm—Watson, Leavenworth, Kelton & Taggart

[57] ABSTRACT

Steel pipe, fittings, joints and valves, lined with PTFE resin are rendered fire-safe for in excess of one hour exposure to open flames by jacketing the components with an enclosure formed from fibrous refractory material. The enclosures are configured and dimensioned to contain a substantially fixed air volume within a predetermined air gap space between the exterior of the component and the interior of the jacket. As an example, high-alumina ceramic fiber mixed with a suitable binder is vacuum formed and then surface coated with an epoxy enamel to produce segments which can be joined around the components to produce satisfactory enclosures. The described segments are reinforced with a metallic skeletal structure which is located so as to permit sizing of openings in the field to accommodate alternative modes of installation.

12 Claims, 8 Drawing Figures

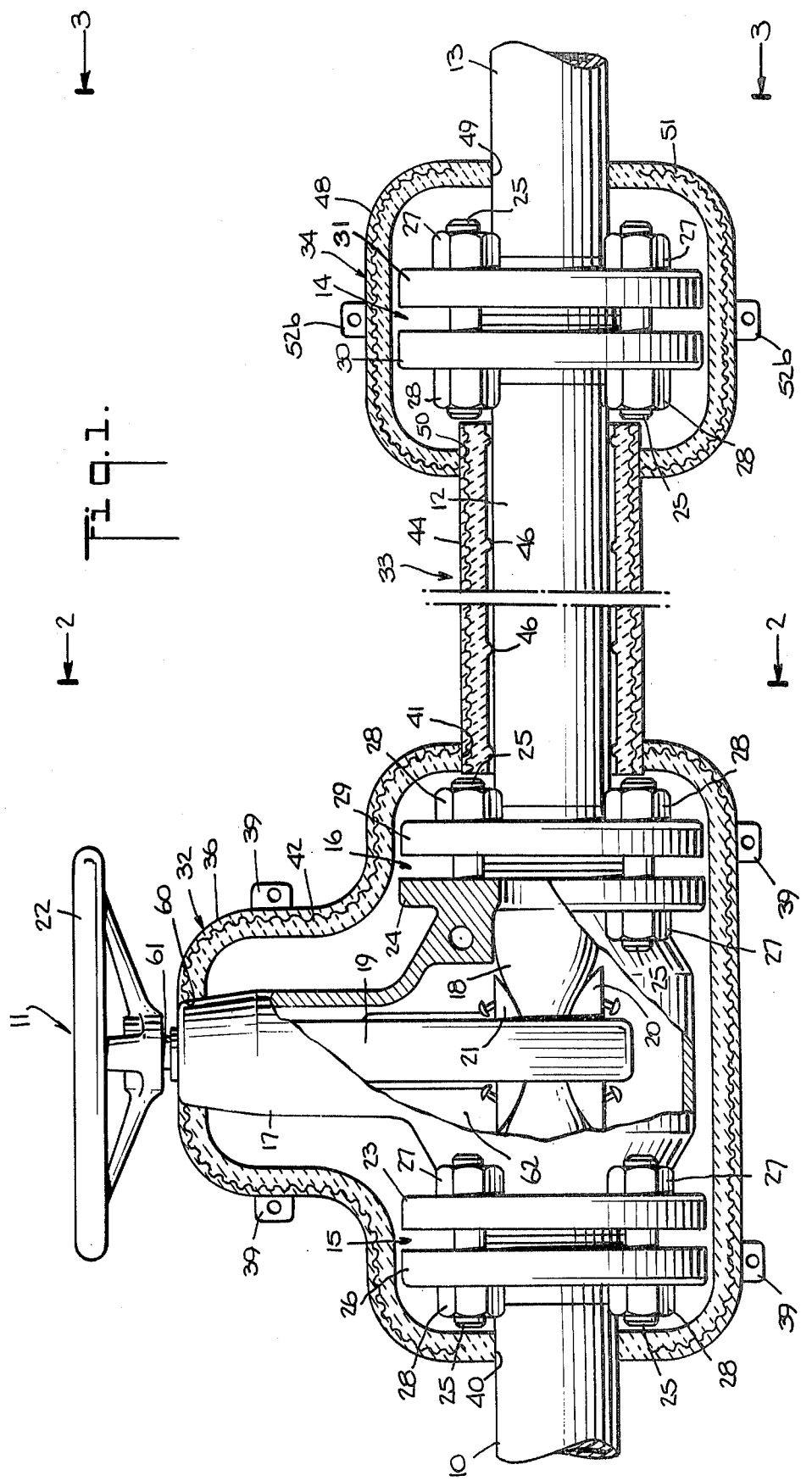

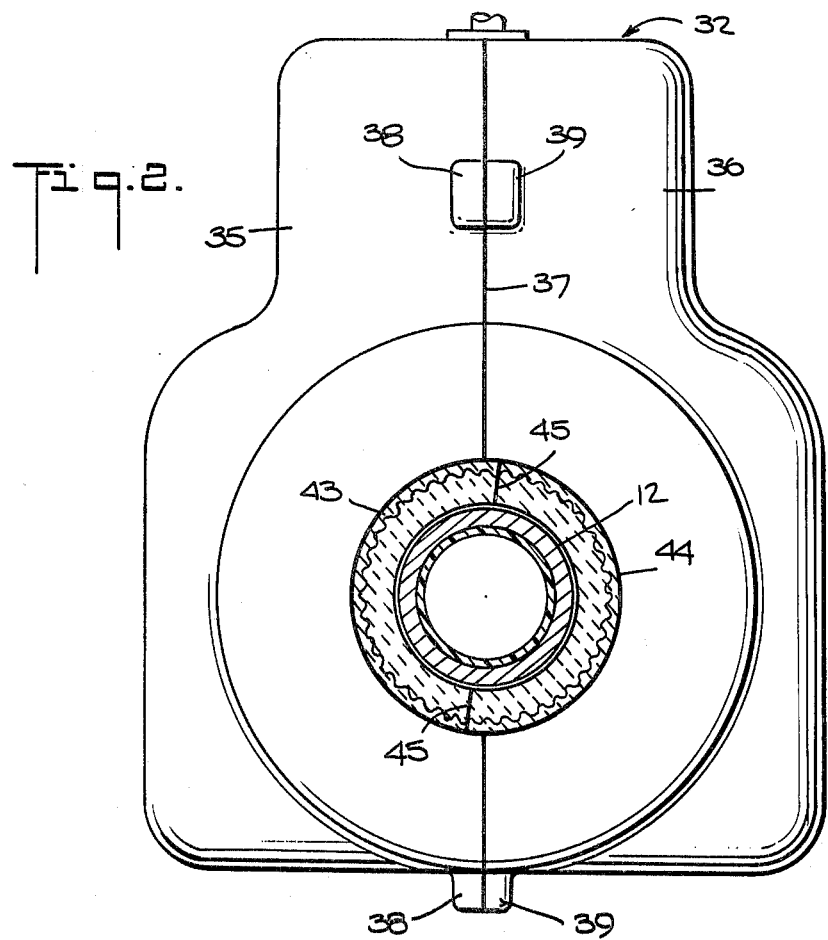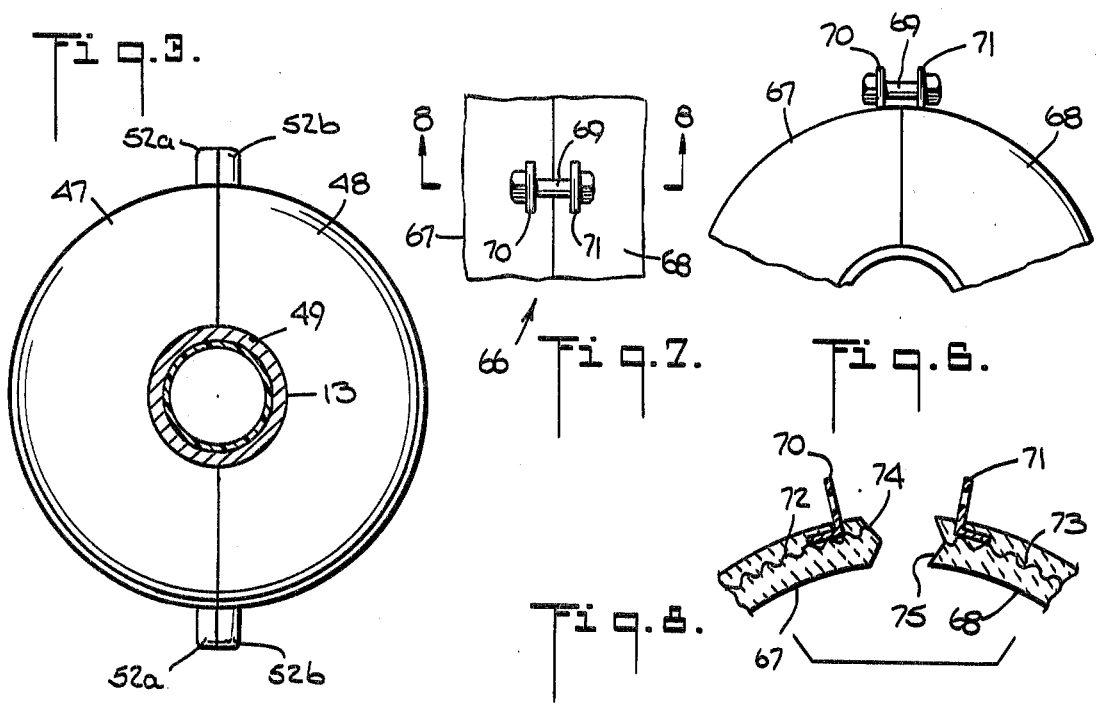

FIRE-SAFE JACKET FOR FLUID PIPING COMPONENTS

The present invention relates to a fireproofing system for fluid piping components and, more particularly, to a firesafe jacket for a fluid piping component selected from the group consisting of valves, fittings and pipe joints, when said component is incorporated in a piping system between lengths of pipe.

There are many situations in which fluid piping is employed to convey fluids which constitute a potential hazard either because they are flammable, toxic, or otherwise susceptible of contaminating the environment. Safe containment of such fluids contemplates that the piping system will, among other characteristics, be fireproof.

From the standpoint of corrosion resistance, it is well known that excellent results are obtained with the use of metal pipe, preferably steel, lined with polytetrafluoroethylene resin (hereinafter abbreviated PTFE). Typically, in such a piping system, the sections of pipe as well as the various fittings are joined by flanged joints. A few years ago there was introduced to the market a constrictable tube valve having a tube component formed from PTFE. The details of construction of such valve are more fully set forth in a series of U.S. patents such as, for example, U.S. Pat. No. 3,811,649, issued May 21, 1974, on an application by Irving D. Press et al., entitled "Constrictable Tube Valve With Plural Wall Tube". While the present invention is not limited thereto, the results obtained through application of the invention may most readily be appreciated from a consideration of its application to protection of a valve of the aforesaid type when forming a part of a piping system.

In order to appreciate what is involved, it is observed that PTFE when used to line a length of straight pipe can be rated at a temperature as high as 500° F. A constrictable valve of the type described in the aforesaid patent is presently rated for operation at 150 psi or full vacuum at 350° F. For certain applications, it is possible to employ such valves at temperatrures up to 450° F.

Typical fireproofing standards have been established by various insurance companies. Factory Mutual Research of Norwood, Massachusetts has established a standard for fire-safe valves. Such standard requires a fire-safe valve designed for handling flammable liquids to withstand a direct fire exposure equivalent to being 18 inches above the surface of free burning normal heptane in a 5 or 10 sq. ft. pan for 15 minutes without leaking through the valve port, if closed, in excess of 0.1 qts. per minute. The specified test setup produces at the valve an average flame temperature of 1000°-1200° F. Said standard further indicates that experience has shown that a maximum pressure rating between 10 and 125 psig is considered adequate for firesafe valve use in the usual flammable liquid piping systems.

With the foregoing as a point of reference, the present invention has enabled constrictable tube valves having a PTFE element to withstand the foregoing fire test for as long as 1½ hrs. without failure of the valve. Both the nature of the test and the results will be described in greater detail hereinafter.

In accordance with one aspect of the present invention, there is provided a fire-safe jacket for a fluid piping component of the type enumerated above wherein said jacket comprises a plurality of segments joinable around said component to form an enclosure thereabout with a predetermined air gap between the exterior of said component and the interior of said enclosure. The segments are formed from refractory material and so configured and dimensioned as to provide when assembled about said component a respective opening through which each of the interconnecting lengths of pipe can separately project with a snug fit and so constructed as to permit removal of said refractory material for selective enlargement of each of said respective openings to a given circumference to accommodate with a snug fit a separate jacket surrounding an adjacent piping component whereby said jackets can cooperate to provide a continuous enclosure for the piping system. The segments are reinforced with a metallic skeletal structure extending throughout the entire body thereof with the exception of the region between said given circumference and said respective opening.

In accordance with yet another aspect of the present invention, there is provided a fire-safe plastic-lined fluid piping component comprising a metal piping component lined with a heat softenable plastic material, and a jacket surrounding said component with a predetermined air gap between the exterior of said component and the interior of said jacket, said jacket comprising a layer of metallic skeletal material disposed within a body of fibrous refractory material united with an inorganic bonding material to form a substantially impact and crush resistant enclosure and cooperating with adjacent piping portions to contain a substantially fixed air volume therebetween, said fibrous material being capable of withstanding a flame temperature in excess of 1200° F., and all surfaces of said jacket are sealed with a coating layer of a liquid-impermeable material.

The fire-safe jacket, in accordance with a still further aspect of the present invention, comprises a layer of metallic skeletal material in the form of expanded metal.

The invention will be better understood after reading the following detailed description of the presently preferred embodiments thereof with reference to the appended drawings in which:

FIG. 1 is a longitudinal sectional view through a typical assembly of piping components involving a valve and a series of pipe spools, all interconnected with flanges and illustrating different aspects of the subject jacket construction;

FIG. 2 is a transverse sectional view taken along line 2—2 in FIG. 1;

FIG. 3 is a transverse sectional view taken along line 3—3 in FIG. 1;

FIG. 6 is a fragmentary view similar to FIG. 3 but showing a modification thereof;

FIG. 7 is a fragmentary top view of the embodiment of FIG. 6; and

FIG. 8 is a sectional view with the parts dissembled taken along the line 8—8 in FIG. 7.

Figure 4:
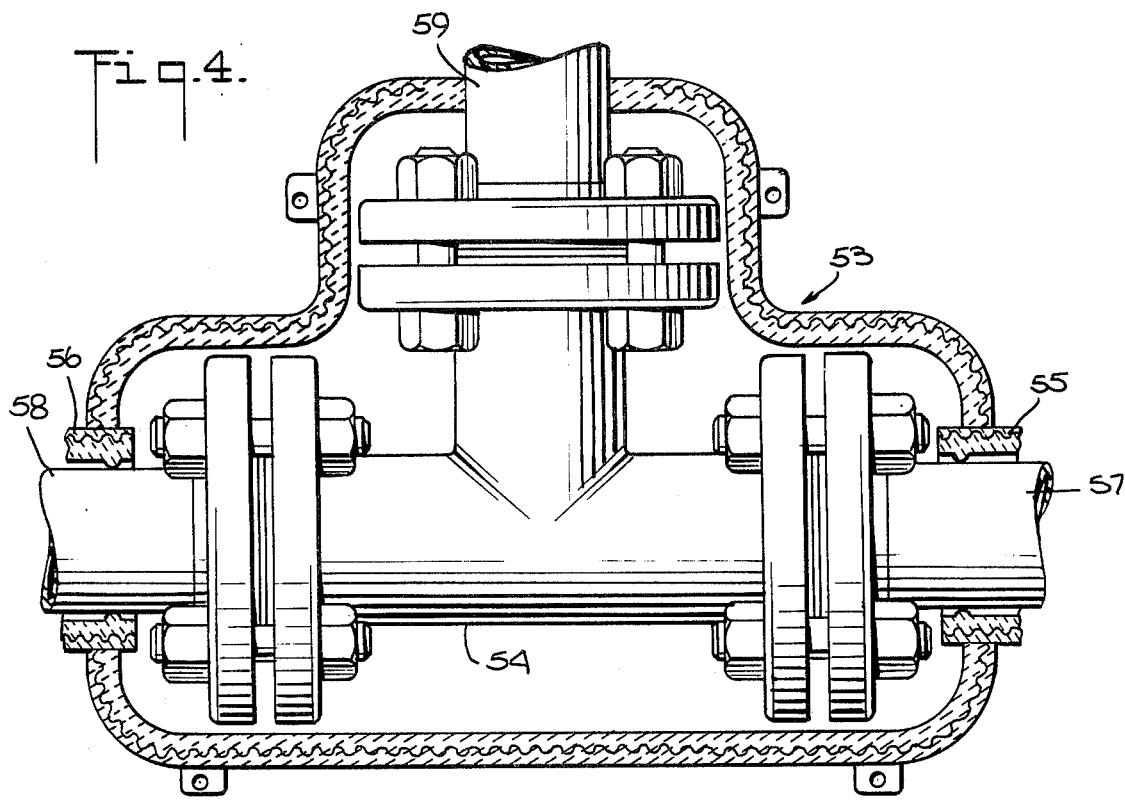
FIG. 4 is a longitudinal sectional view through another assembly of a jacket and piping component further illustrating the invention.

Reference should now be had to the drawings wherein the same reference numerals are used throughout to designate the same or similar parts. Referring initially to FIG. 1, there is illustrated as a means of explaining the subject invention, a piping run consisting from left to right of a length of pipe 10, a valve 11, a length of pipe 12 and a further length of pipe 13. A flanged joint 14 interconnects pipes 12 and 13. Similarly, flanged joints 15 and 16 interconnect the valve 11, respectively, with pipes 10 and 12.

The valve 11 consists of a metal housing 17 enclosing a constrictable tube element 18 formed from PTFE resin. A metal yoke 19 carries a lower compressor member 20 which cooperates with an upper compressor member 21 for constricting the tube element 18 under the control of hand wheel 22. Housing 17 has connecting flanges 23 and 24 formed integral therewith. Flange 23 is connected by a plurality of bolts, designated by the reference numeral 25 to a flange 26 mounted on pipe 10. Nuts 27 and 28 are disposed on opposite ends of the headless bolts 25, as shown. As mentioned previously, the pipes in the subject installation are lined with PTFE resin. In such an installation the resin liner extends beyond the outer face of the pipe flange and is flared thereover to function as a gasket seal between adjacent flanges. For certain purposes, the flared portion of the liner may be cushioned by interposition of a resilient gasket between the liner and the flange face. The combination of flanges 23 and 26 with interconnecting nuts and bolts constitutes the flanged joint 15. In similar fashion, the joint 16 includes the valve housing flange 24, a flange 29 mounted on pipe 12, bolts 25, and nuts 27 and 28. Flanged joint 14 includes pipe flanges 30 and 31 carried, respectively, by pipe lengths 12 and 13. The flanges 30 and 31 are interconnected by bolts 25, and nuts 27 and 28.

The construction of the valve 11 and pipes 10, 12, and 13 forms no part of the present invention. Further details of the valve 11 may be gleaned from the aforesaid U.S. Pat. No. 3,811,649.

As shown in FIG. 1, piping components, 11, 12, 14, 15 and 16 are enclosed within fire-safe jacket elements. Thus, a fire-safe jacket 32 encloses valve 11 and joints 15 and 16, fire-safe jacket 33 encloses pipe 12, while fire-safe jacket 34 encloses joint 14.

As best seen in FIGS. 1 and 2, the jacket 32 consists of two segments 35 and 36 joined around the valve component 11 along the vertical line 37. When installed, the segments 35 and 36 are at present preferably bonded together by a refractory cement along the line 37. A plurality of confronting ears, 38 and 39, may be formed on the respective jacket segments 35 and 36 to accept any suitable uniting elements such as rivets, bolts or other attachment means, not shown.

When the segments 35 and 36 are joined around the valve component 11 to form an enclosure thereabouts, such enclosure is formed with a predetermined air gap between the exterior of said valve component and the interior of said enclosure. The segments 35 and 36 are so configured and dimensioned as to provide when assembled about the valve component 11 a respective opening, e.g., the opening 40, through which each of the lengths of pipe, such as 10 and 12, can separately project with a snug fit. As seen in FIG. 1, the opening 40 on the left side of the jacket 32 mates directly with the exterior of the metal wall of the pipe 10. However, on the right side of the jacket 32 the opening 41 has been enlarged in order to mate with a snug fit with the exterior of the jacket 33 which encases pipe 12. The joint between the opening 41 and the exterior of jacket 33 should be caulked with a compatible refractory cement.

The segments 35 and 36 which form jacket 32 should be formed from refractory material. Suitable segments 35 and 36 have been produced by molding employing a vacuum forming process in which a slurry of high-alumina ceramic fiber and inorganic bonding material is formed against a mold cavity and over a reinforcing layer of metallic skeletal material, such as that shown at 42. The slurry is then cured and all surfaces are then preferably sealed with a coating layer of a liquid-impermeable material such as an epoxy enamel.

As shown in FIG. 1, the reinforcing metallic skeletal structure extends throughout the entire body of the jacket 32 with the exception of the region between opening 40 which is sized to fit snugly against the bare pipe and a predetermined enlarged circumference dimensioned to clear the outer diameter of a pipe jacket such as that shown at 33. Thus, the unreinforced region of the jacket 32 may be removed readily with a sharp instrument to enlarge the opening from the diameter of the opening 40 to the diameter of the opening 41 in order to accommodate a pipe jacket of the type shown at 33.

While the invention is not limited thereto, it is presently preferred to employ a skeletal structure 42 of steel formed by an expanded metal process. Obviously, any other suitable fireproof skeletal structure may be employed.

The jacket 33 may be formed from the same material as the jacket 32 and by the same process. For convenience, it may be formed in two segments 43 and 44, best shown in FIG. 2 which, when assembled about pipe 12, are presently preferably bonded together by a refractory cement along the line 45. As with the jacket 32 which encloses valve 11, the jacket 33 which encloses pipe 12 should be spaced radially therefrom by a predetermined distance in order to provide a predetermined air gap therebetween. To maintain such air gap the inner surface of the jacket segments 43 and 44 may be provided with suitable projections. Any protuberance is satisfactory so long as the area of physical contact between the protuberance and the pipe is minimized. Typical projections are shown in FIG. 1 at 46 and may take the form of a continuous annular rib or may be interrupted.

By joining the jacket 32 to the jacket 33, a continuous enclosure is provided for the piping components consisting of the valve 11, joint 16 and pipe 12. This may be extended throughout the entire piping system, as desired.

Further, as shown in FIG. 1, the flanged joint 14 is enclosed by jacket 34 which may be formed in two segments 47 and 48, as best seen in FIG. 3, by the same process as jackets 32 and 33. As illustrated at 49 and 50, the jacket 34 for the flanged joint 14 is provided with openings similar to the openings 40 and 41, respectively, of the valve jacket 32. That is, opening 49 of jacket 34 makes a snug fit with the exterior of bare pipe 13, while opening 50 makes a snug fit with the outer surface of jacket 33. The segments 47 and 48, which constitute jacket 34, are reinforced with a metallic skeletal structure 51 except for the region between the circumference of opening 49 and the enlarged circumference corresponding to opening 50. It will be understood that the opening 49 could be enlarged in the same manner as the opening 50 to accommodate a jacket on pipe 13. Also opening 40 on jacket 32 could be enlarged for the same purpose if pipe 10 were to be jacketed. As a corollary, the jacket 33 could be removed and openings 41 and 50 of jackets 32 and 34, respectively, could be left in their original smaller diameter condition so as to snugly engage the exterior of pipe 12.

The jacket 34 may be provided with ears 52a and 52b in order to accommodate a suitable fastener for ensuring that the segments 47 and 48 do not separate.

FIG. 4 shows the principles of the present invention applied to an enclosure 53 for a Tee pipe fitting such as 54. The construction of the jacket 53 is similar to that previously described with reference to jackets 32 and 34, while the jackets 55 and 56 on pipes 57 and 58, respectively, may be similar to the jacket 33 on pipe 12. The fact that pipes 57 and 58 in FIG. 4 are shown jacketed, while the vertical pipe 59 is shown unjacketed is merely for the purpose of illustration and may be varied as desired.

Referring again to FIG. 1, the jacket 32 is shown as making a snug fit with the top of the valve housing 17 at 60. It will be understood that if sufficient clearance exists between valve handle 22 and housing 17 the jacket 32 might extend over the top of the housing and closely surround the valve stem 61.

From the foregoing description, it should be apparent that each of the jackets of refractory material enclosing the corresponding pipe components functions to contain a substantially fixed air volume between such jacket and the underlying component. All joints between the refractory segments are presently preferably sealed with a refractory cement although no effort need be made to establish an hermetic seal.

In any fire situation, the valves in the fluid piping system are probably the most critical components. In any case, a comparison of the effects of enclosing a valve such as the valve 11 with the refractory jacket 32 will furnish ample indication of the efficacy of the present invention. For the purpose of establishing a base line, a valve constructed similar to the valve 11, and of 2 inch size, was subjected to the Factory Mutual Research test described above. Such exposure was conducted without any fire protection afforded to the valve. The valve during the test was in the closed position with fluid pressure of 225 psi on one side and atmospheric pressure on the other side thereof. The same pressure was maintained in all of the tests to be described. The external temperature caused by the heptane flame was in excess of 1200° F. The air temperature within the valve housing 17 in the space 62 shown in FIG. 1 was monitored and has been plotted in FIG. 5 with respect to time in the curve designated "2 inch unprotected valve". Within 9½ minutes the temperature in the space 62 within the valve housing reached 1200° F. at which point the valve failed.

In another test, a similar 2 inch valve and its adjacent piping were enclosed in jackets, in accordance with the present invention as described with reference to FIG. 1 to 3 above. The wall thickness of each jacket was approximately ½ inch. The molded material had an average density of about 15 lbs./cu. ft. and a heat transfer or "K" factor of approximately 0.64 BTU/sq. ft./ Hr/° F./in., at a mean temperature of 1000° F. The fire was extinguished after 95 minutes and the air temperature within the valve housing in the region 62 followed the curve 63 shown in FIG. 5. As seen from said curve the air temperature within the valve housing reached 450° F. after about 53 minutes and passed the 500° F. mark after approximately 61 minutes. However, the valve did not leak fluid past the closure throughout the entire test of 95 minutes.

Figure 5:
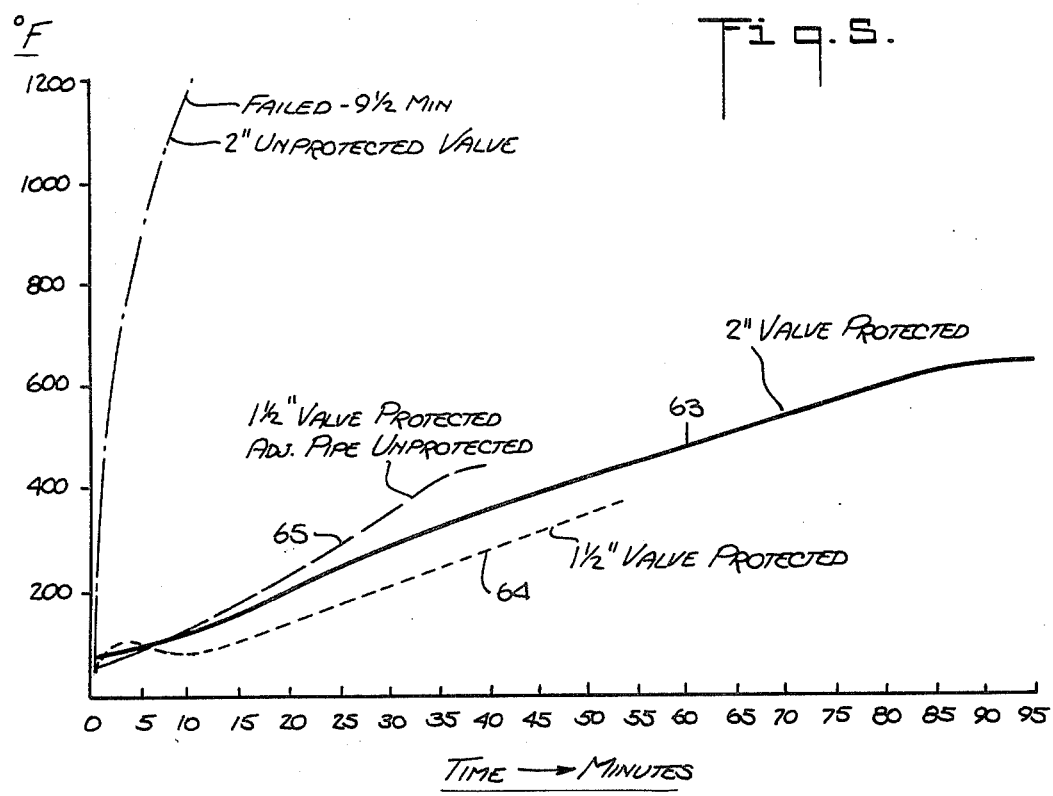
FIG. 5 is a graph showing test data in connection with said components.

A 1½ inch version of the same valve was similarly tested and the results are shown in curve 64 of FIG. 5.

In order to explore the effect of jacketing the adjacent pipe connected with the valve, a test was run with only the valve jacketed and with the adjacent pipe remaining unprotected. The results are plotted in curve 65 of FIG. 5. Even under the last mentioned conditions, the jacket affords substantial fire protection for the valve which maintained its usability throughout the entire test which was terminated by extinguishing the flame after about 33 minutes. Residual heat accounts for the rise in temperature up to the 40-minute mark.

It should be appreciated from the foregoing description that the jacket which encloses a valve, fitting or joint extends beyond said component to cooperate with the adjacent pipe spools. The jackets around the pipe spools enter the jackets which are around the other components rather than vice versa. It is believed that such arrangement yields maximum flexibility in an efficient manner.

While ears have been formed on the refractory jackets for enabling mechanical fastening, straps, bands, wires or other means may be employed as an alternative to ensure joining of the individual segments of the jacket.

Where refractory cement is employed at the joints between segments of the jackets, mechanical fastening serves an auxiliary function and, under certain conditions, may be omitted. Under other conditions it may be sufficient to form the mating edges of the jacket segments with an overlapping or interdigitated configuration, omit the cement, and rely on mechanical attachment for the primary joining function. For example, as shown in FIGS. 6, 7 and 8, a jacket 66 consisting of segments 67 and 68 is united by the bolt 69 through ears 70 and 71. As best seen in FIG. 8, the ears 70 and 71 are part of angle pieces which are joined by welding or the like to the reinforcing structures 72 and 73, respectively. The mating edges 74 and 75 of segments 67 and 68 are complementally V-shaped to provide an interlocking joint. Obviously, other joint configurations may be employed. One advantage of this construction is that the jacket can be disassembled readily without risk of damage to the segments.

The refractory material is important in determining the efficacy of an embodiment of the present invention. Likewise important is the controlled air volume contained between jacket enclosure and piping component. The magnitude of said volume is not critical so long as the inner surface of the jacket is kept out of contact with the pipe components wherever possible. It has been found that high-alumina ceramic fiber refractory material when reinforced with a metallic skeletal structure has substantial impact and crush resistance. Hence, the air space can be determined empirically, initially, and used in subsequent jackets for identical piping components. Such use of a controlled air space must be differentiated from the random and uncontrolled space employed in the construction of the "Flame-Resistant Flexible Hose Assembly" described in U.S. Pat. No. 2,787,289 issued Apr. 2, 1957 on an application of Irving D. Press.

At present, satisfactory results have been obtained with jacket segments formed from high-alumina ceramic fiber material. However, segments formed from any fibrous material capable of withstanding a flame temperature in excess of 1200° F. should give satisfactory results.

Epoxy enamel has been found well suited for coating the surface of the segments. Its essential function is to strengthen and protect the surface of the molded segments from flaking or crumpling or otherwise pilling. At the same time it acts as a sealant to prevent absorption of flammable liquids and the like. Other coating materials of a similar nature may be employed as desired.

Having described the presently preferred embodiments of the subject invention, various changes in construction and materials may occur to those skilled in the subject art, and it is intended to encompass all such changes as may fall within the true spirit of the invention as defined in the appended claims.

What is claimed is:

1. A fire-safe jacket for protecting a fluid piping component from damage when exposed to fire, said jacket comprising a plurality of molded segments with each segment comprising a layer of expanded metal disposed within a body of fibrous refractory material united with an inorganic bonding material to form a substantially impact and crush resistant structure, said fibrous material being capable of withstanding a flame temperature in excess of 1200° F., and all surfaces of said body are sealed with a coating layer of a liquid-impermeable material.

2. A fire-safe jacket according to claim 1, wherein said refractory material is a high-alumina ceramic fiber.

3. A fire-safe jacket according to claim 2, wherein said liquid-impermeable material is an epoxy enamel.

4. A fire-safe jacket according to claim 1, wherein said liquid-impermeable material is an epoxy enamel.

5. A fire-safe jacket for a fluid piping component selected from the group consisting of valves, fittings and pipe joints, when said component is installed in a piping system between lengths of pipe, said jacket comprising a plurality of segments joinable around said component to form an enclosure thereabout with a predetermined air gap between the exterior of said component and the interior of said enclosure, said segments being formed from refractory material and so configured and dimensioned as to provide when assembled about said component a respective opening through which each of said lengths of pipe can separately project with a snug fit and so constructed as to permit removal of said refractory material for selective enlargement of each of said respective openings to a given circumference to accommodate with a snug fit a separate jacket surrounding any of said corresponding lengths of pipe whereby said jackets can cooperate to provide a continuous enclosure for said piping, said segments being reinforced with a metallic skeletal structure extending throughout the entire body thereof with the exception of the region between said given circumference and said respective opening.

6. A fire-safe jacket according to claim 5, wherein said metallic skeletal structure consists of a layer of expanded metal, and said segments comprise a body of fibrous refractory material united with an inorganic bonding material forming a substantially impact and crush resistant structure, said fibrous material being capable of withstanding a flame temperature in excess of 1200° F.

7. A fire-safe jacket according to claim 6, wherein all surfaces of said segments are sealed with a coating layer of a liquid-impermeable material.

8. A fire-safe jacket for a fluid piping component selected from the group consisting of valves, fittings, and pipe joints, when said component is installed in a piping system between lengths of pipe, said jacket comprising a plurality of segments joinable around said component to form an enclosure thereabout with a predetermined air gap between the exterior of said component and the interior of said enclosure, said segments being formed from fire-safe reinforced refractory material and so configured and dimensioned as to provide when assembled about said component a respective opening through which each of said lengths of pipe can separately project with a snug fit and so constructed as to permit removal of said refractory material for selective enlargement of each of said respective openings to a given circumference to accommodate with a snug fit a separate jacket surrounding any of said corresponding lengths of pipe whereby said jackets can cooperate to provide a continuous enclosure for said piping, said segments being coated on all interior and exterior surfaces with a surface sealing epoxy enamel.

9. A fire-safe jacket for a fluid piping component comprising a molded member formed from a fire-safe refractory fiber slurry molded over a reinforcing layer of metallic skeletal material and cured, with, the interior and exterior surfaces of said member sealed with a coating layer of a liquid-impermeable epoxy enamel.

10. A fire-safe plastic-lined fluid piping component comprising a metal piping component lined with a heat softenable plastic material, and a jacket surrounding said component with a predetermined air gap between the exterior of said component and the interior of said jacket, said jacket comprising a layer of metallic skeletal material disposed within a body of fibrous refractory material united with an inorganic bonding material to form a substantially impact and crush resistant enclosure and cooperating with adjacent piping portions to contain a substantially fixed air volume therebetween, said fibrous material being capable of withstanding a flame temperature in excess of 1200° F., and all surfaces of said jacket are sealed with a coating layer of a liquid-impermeable material.

11. A fire-safe plastic-lined fluid piping component according to claim 10, wherein said refractory material is a high-alumina ceramic fiber.

12. A fire-safe plastic-lined fluid piping component according to claim 11, wherein said liquid-impermeable material is an epoxy enamel.

* * * * *